United States Patent [19]

Natori

[11] Patent Number: 4,530,847

[45] Date of Patent: Jul. 23, 1985

[54] METHOD OF MANUFACTURING FISH AND CHEESE CONTAINING FOOD PRODUCTS

[75] Inventor: Koichi Natori, Tokyo, Japan

[73] Assignee: Natori Shokai Co., Ltd., Tokyo, Japan

[21] Appl. No.: 548,786

[22] Filed: Nov. 4, 1983

[30] Foreign Application Priority Data

Nov. 4, 1982 [JP] Japan ................................ 57-193611

[51] Int. Cl.³ .............................................. A23L 1/325
[52] U.S. Cl. .................................... 426/274; 426/582; 426/643; 426/513; 426/517; 426/410
[58] Field of Search ............... 426/274, 582, 643, 513, 426/517, 124, 410

[56] References Cited

U.S. PATENT DOCUMENTS 1,956,239 4/1934 Kuhner ............................... 426/274

FOREIGN PATENT DOCUMENTS

| 4028414 | 7/1974 | Japan | 426/643 |
| 5243907 | 11/1977 | Japan | 426/643 |
| 0034821 | 10/1979 | Japan | 426/124 |
| 0017633 | 2/1981 | Japan | 426/124 |

*Primary Examiner*—Robert Yoncoskie
*Attorney, Agent, or Firm*—Wenderoth, Lind & Ponack

[57] ABSTRACT

A method of manufacturing fancy food, comprising adding starch, seasonings and the like to mashed fish meat and kneading them to form a sheet-like kneaded material, heating said material and thereafter drying it to prepare a sheet of fish meat, sandwiching cheese between two sheets of said fish meat to form a food element, vertically pressing said food element by heated roaster plates to melt upper and lower surfaces of cheese to adhere said upper and lower sheets of fish meat to cheese, cooling said adhered food element and setting a water content thereof to approximately 33 to 38%, thereafter cutting the food element to form products, and sealing said products together with a disoxidant into a package bag.

4 Claims, 8 Drawing Figures

METHOD OF MANUFACTURING FISH AND CHEESE CONTAINING FOOD PRODUCTS

BACKGROUND OF THE INVENTION

The present invention relates to a method of manufacturing fancy foods composed of sheets of fish meal principally comprising fish meat and cheese.

Kneaded and dried food principally formed of a material of fish meat such as cod comprise materials which are relatively inexpensive and easily caught and have been more frequently used recently. The said products have been utilized for many kinds of delicate and fancy foods as well as dressed cuttlefish and similar products. On the other hand, cheese contains a large quantity of proteins, fats, vitamins, etc. and has been extensively eaten even by Japanese people as well as Europeans and Americans as nutritious food of fine flavor.

As examples of foods wherein the flavor of flattened cuttlefish and the flavor of cheese are well harmonized, attention is directed to the inventions described in Japanese Patent Publication No. 48-2336, Japanese Patent Application Laid-Open No. 54-113464, etc. However, in these inventions, when cheese is sandwiched between the flattened cuttlefishes and they are pressed and heated while being put between heat resisting iron plates, they are pressed for about five minutes and heated at a temperature of 120° to 180° C. This condition of heating is a high temperature heating above a melting temperature (90° for process cheese) of the cheese itself which is sandwiched between the flattened cuttlefishes. Under such temperature conditions, the cheese is melted out and most probably, the desired products may not be obtained. Further, the flattened cuttlefish itself is dried by high temperature heating, and therefore the product itself is felt to be hard, and its desirable properties deteriorated. On the other hand, an invention of sandwich-like products in which cheese is sandwiched between fish meat kneaded products is disclosed in Japanese Utility Model Application Laid-Open No. 57-117993. In this case, a dried product formed of a raw material of the minched flesh of fish is coated with a paste-like adhesive material in which a sorbital containing liquid and a natural polysaccharide aqueous solution are mixed, and thereafter a slice of cheese is sandwiched therebetween. This product has suffered from the disadvantages in that desirability of the fish meat kneaded product and cheese is impaired by the interposition of said paste-like adhesive material. Moreover, these conventional inventions use cheese materials which are pure dairy products that get moldy easily, and lack preservative properties.

SUMMARY OF THE INVENTION

The present invention has been achieved by attempting to overcome the various disadvantages noted above with respect to the prior art inventions. It is a specific object of the present invention to provide a method of manufacturing fancy food which has soft feeling or texture without impairing the nature and taste inherent in the sheet of fish meat and cheese and yet can prevent the generation of bacterium such as mold, thereby enhancing the preservative properties of the products.

To achieve the aforesaid object, the present invention is characterized in that the water content of the product is set to be high, approximately 33 to 38%, to provide soft texture, and in packaging products, a deoxidant is sealed therein to remove oxygen within a package bag to enhance the preservative properties of products.

DETAILED DESCRIPTION OF THE INVENTION

The present invention will now be described in order of steps with reference to the accompanying drawings.

Figure 1:
FIG. 1 is a perspective view of a sheet of fish meat.

(1) First, starch, the white of an egg, salt, chemical seasonings and a sweet sake are added to mashed meat of cod and kneaded, said kneaded material is molded, by a well-known rolling and molding machine to form a sheet of approximately 1 to 5 mm thick, and said sheet is heated and roasted to a temperature of 80° to 85° C. The roasted kneaded material is milk-white and tinged with a somewhat yellow color as a whole, and the upper and the lower surface portions thereof are scorched. Next, the material is cut into a rectangular shape of an approximate length of 100 mm×a breadth of 450 mm and dried by a hot air dryer at 30° to 40° C. to produce a product having a water content of about 17 to 22%, then a sheet of fish meat (1) of 1 to 3 mm thick as shown in FIG. 1 is obtained.

Figure 2:
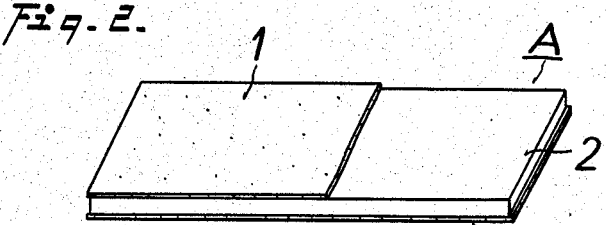
FIG. 2 is a perspective view of a food element partly cutaway.

(2) Subsequently, cheese (2), which has substantially the same shape as that of the sheet of fish meat (1), sliced to 3 to 5 mm thick and has water content of about 42 to 43%, is placed on said sheet of fish meat (1), another cheese (2) is placed on the sheet of fish meat (1) and the cheese (2) is sandwiched between upper and lower sheets of fish meat (1) and (2), then a food element (A) shown in FIG. 2 is formed.

Figure 3:
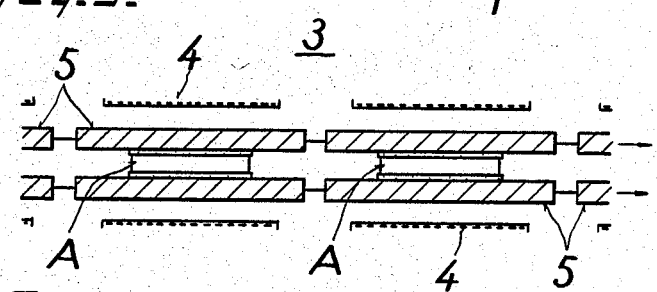
FIG. 3 is a fragmentary longitudinal view showing the state of operation of a press roaster.

(3) The thus obtained food element (A) is pressed and heated by a well known press roaster (3) as shown in FIG. 3. In this step, the food element (A) is heated by a heating source (4) such as gas and is transported within the press roaster (3) while being held between each pair of upper and lower roaster plates (5) which opposed roaster plates are circulated and driven in the paired relation. At this time, each roaster plate (5) is heated by the heating source (4) so that the surface of each roaster plate (5) may assume a temperature of approximately 80° to 100° C., and the food element is transported within the roaster (3) for about 2 to 3 minutes. That is, each food element (A) is heated for about 2 to 3 minutes at a temperature of about 80° to 100° C. while being suitably pressed by the pair of upper and lower roaster plates (5) and (5). The upper and lower sheets of fish meat (1), (1) of the pressed and heated food element (A) are heated and expanded as a whole to the extent that they are not scorched at their surfaces in contact with the pair of upper and lower roaster plates (5), (5), whereas the cheese (2) sandwiched between these upper and lower sheets of fish meat (1), (1) is melted only in its upper and lower surface portions and engaged into and adhered to rugged surfaces of each of the sheets of fish meat (1), (1). At this time, the temperature of the roasted food element (A) is about 70° to 76° C.

Figure 4:
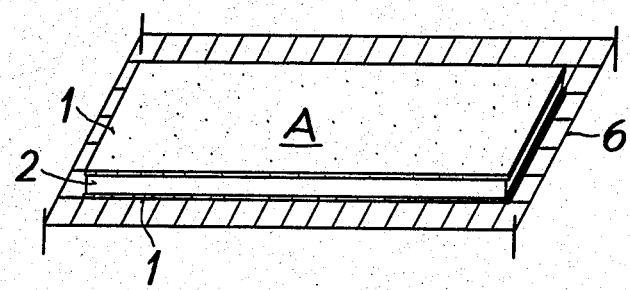
FIG. 4 is a perspective view showing the state of cooling of the food element.

(4) Next, as shown in FIG. 4, the aforesaid food element (A) is placed on a cooling shelf (6) to cool it to have water content of approximately 33 to 38% and thickness of approximately 4.5 to 10 mm. Here, the temperature of the food element (A) is substantially equal to room temperature. Alternatively, in this step, while forced cooling by an air blower or the like can be employed, such cooling should be carried out under the conditions that the water content of the food element (A) is approximately 33 to 38%.

Figure 5:
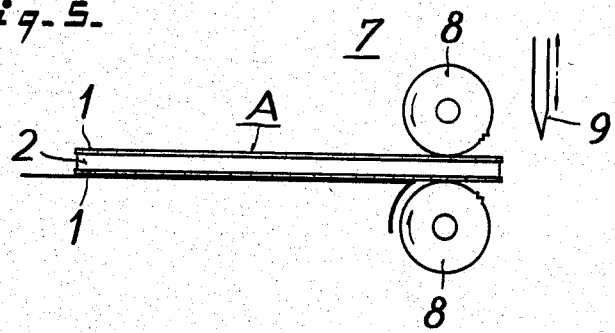
FIG. 5 is a front view showing the state of cutting the food element.
Figure 6:
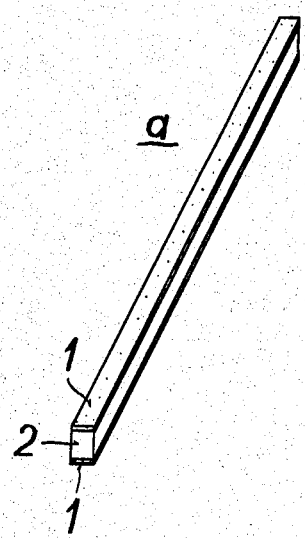
FIG. 6 is a perspective view of a product.
Figure 7:
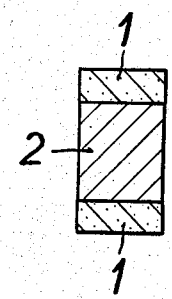
FIG. 7 is an enlarged longitudinal sectional view of a product.

(5) Then, as shown in FIG. 5, the food element (5) cooled as described above is cut into a fixed shape by means of a well-known cutting machine 7 having a pair of upper and lower indented rollers (8), (8) intermittently roated in a direction opposite to each other and a cutter (9) moved up and down in synchronism with these indented rollers (8), (8). In this step, the food element (A) is transported towards the cutter (9) by the intermittent rotation of the upper and lower indented rollers (8), (8) and cut into a suitable fixed width of about 3 to 10 mm by the operation of the cutter (9), and the cheese (2) is sandwiched between the upper and lower elongated sheets of fish meat (1), (1) as shown in FIGS. 6 and 7 to make a product (a) of water content of approximately 33 to 38% having soft feeling of eat.

Figure 8:
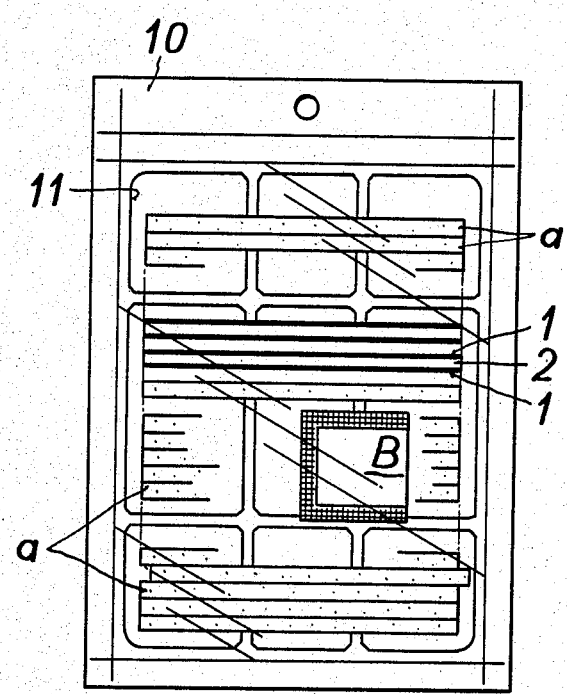
FIG. 8 is a front view showing the state of packaging products.

(6) Finally, in packaging the thus obtained products (a) in a package bag (10), as shown in FIG. 8, both a fixed quantity of products (a) and a deoxidant (B) are put into a tray (11), and thereafter the tray (11) is accommodated in the package bag (10) to seal an opening of the package bag (10). Said package bag (10) is formed of a film or the like which has no permeability to cut off ventilation with open air. The deoxidant (B) is formed in such a way that a solid composition absorbing oxygen within the package bag (10) is sealed by a ventilative packaging material. Said composition includes principal effective components, for example, such as an iron powder, such as iron carbide, a reducing inorganic salt such as thionite, sulfite and ferrite salt, a polyphenol such as hydroquinone, catechol, pyrogallol, gallate, and butyhydroxyanisol, a reducing saccharin such as glucose, and a reducing polyalcohol such as ascorbic acid, isoascorbic acid, etc. Oxygen within the package bag (10) is absorbed by the deoxidant (B) to render the interior of the package bag (10) free from oxygen to prevent generation of mold or the like. However, the deoxidant will not absorb water of approximately 33 to 38% possessed by the products (a) but prevent generation of mold or the like while the products (a) maintains its water content.

Next, examples of the present invention will be described in the order of steps.

EXAMPLE 1

Where sheets of fish meat and process cheese are used:

As materials for a sheet of fish meat, the following are kneaded,

| | |
|---|---|
| Minced flesh of cod | 100 Kg |
| Starch | 25 Kg |
| The white of an egg | 40 Kg |
| Salt | 4 Kg |
| Chemical seasonings | 7 Kg |
| (glutamic acid soda) | |
| Sweet sake | 2 Kg | said kneaded material is formed into a sheet of approximately 5 mm thick by a well known rolling and molding machine and said sheet-like kneaded material is heated and roasted by a well known roaster up to a temperature of 80° to 85° C. The roasted kneaded material is cut into a rectangular shape of length 110 mm × breadth 450 mm and thereafter dried by a hot air dryer at 30° to 40° C. to form a sheet of fish meat of approximately 1 mm thick having a water content of approximately 17.5%. A single process cheese having a water content of approximately 42.5% sliced to about 3 mm thick is sandwiched between two sheets of fish meat to form a food element. Next, said food element is inserted between upper and lower roaster plates having a surface temperature of about 90° C. of a well known press roaster. The food element is subjected to pressing and heating while being held between the pair of upper and lower roaster plates circulated and driven. The sheet of fish meat becomes expanded and softened by said pressing and heating, and the upper and lower surface portions of the process cheese are melted and are engaged into and firmly adhered to the rugged surfaces of each of upper and lower sheets of fish meat. Afterwards, said food element is placed on the cooling shelf and cooled till it will have approximately 5 mm thick and approximately 35.5% of water content. Said cooled food element is cut by a well known cutting machine into elongated strips of width about 3 mm × thickness about 5 mm × length about 110 mm to obtain soft products of approximately 35.5% (average value) of water content. Then, 75 g of said products and the deoxidant (made by K.K. Diachemifa—Goods Symbol ORG) are put into a package bag formed of a resin film having no permeability (Film material KNY/PE/CPP 3 layers, made by Dai-Nippon Printing Company, Interior Volume of Bag—approx. 360 cm$^3$) and sealed.

This product has a taste in which the sheet of fish meat and process cheese are harmonized, has a soft feel in the mouth and is easy to eat.

EXAMPLE 2

Where red pepper is added to upper and lower surfaces of sheets of fish meat and cheese:

A sheet of fish meat of a water content of 21.5% and about 3 mm thick is manufactured in accordance with the steps similar to the above-described Example 1. Cheese is sliced to a thickness of about 4 mm, red pepper is approximately evenly scattered on the upper and lower surfaces thereof, and the water content thereof is set to approximately 42.5%. A food element is formed in which a single cheese with red pepper is sandwiched between two sheets of fish meat. Said food element is inserted between the upper and lower roaster plates having a surface temperature of about 98° C. of a well known press roaster. The food element is subjected to pressing and heating for about 2 minutes and 30 seconds while being held between the pair of upper and lower roaster plates circulated and driven, whereby each of upper and lower sheets of fish meat becomes expanded and further softened and the upper and lower surface portions of cheese with red pepper are melted and engaged into and firmly adhered to the rugged surfaces of each of the upper and lower sheets of fish meat. Next, said food element is placed on the cooling shelf and cooled till it has a thickness of approximately 10 mm and a water content of approximately 33.5%. The cooled food element is cut by a well known cutting machine into elongated strips having a width of 10 mm × a thickness 10 mm × a length about 110 mm to obtain soft products of approximately 33.5% (average value) of water. 75 g of said products and the deoxidant (similar to Example 1) are put into a package bag (similar to Example 1) having no permeability and sealed.

This product has taste of red pepper in addition to taste of fish meat and cheese, and had a soft feeling in the mouth and is delicious. In external appearances the product is colorful because of the red pepper scattered on the contact surface between the cheese and sheets of fish meat.

EXAMPLE 3

Where sheets of fish meat and cheese with a Japanese horseradish kneaded therewith are used:

A sheet of fish meat of a water content of 19% and about 1 mm thick is manufactured in accordance with the steps similar to the above-described Example 1. Cheese is prepared by kneading a suitable quantity of Japanese horseradish with process cheese and is pale green as a whole, and has a water content of approximately 42%. The thus formed cheese with a Japanese horseradish is sliced to about 5 mm thick. Subsequently, a single cheese with Japanese horseradish is sandwiched between said two sheets of fish meat to form a food element. Next, the food element is inserted between the upper and lower roaster plates of a well known press roaster having a surface temperature of about 85° C. The food element is subjected to pressing and heating for 3 minutes while being held between the pair of upper and lower roaster plates circulated and driven, whereby each of the upper and lower sheets of fish meat becomes expanded and further softened and the upper and lower surface portions of cheese with a Japanese horseradish are melted, and engaged into and firmly adhered to the rugged surfaces of each of the upper and the lower sheets of fish meat. Next, said food element is placed on the cooling shelf and cooled till it is approximately 7 mm thick and has a water content of approximately 33.5% water. The cooled food element is cut by a cutting machine into elongated strips of a width 3 mm × a thickness 7 mm × a length 110 mm to obtain soft products made of approximately 37.5% (average value) of water. 75 g of said product and the deoxidant (similar to Example 1) are put into a package bag (similar to Example 1) having no permeability and sealed.

This product has taste in which taste of the sheets of fish meat and of a Japanese horseradish are harmonized, has a soft feel and is delicious. Moreover, the pale green cheese is positioned between the sheets of milk white fish meat, thus providing a product which is rich in color contrast.

Next, the results of preservation inspection for the products obtained in the aforementioned Examples 1, 2 and 3 are given in Table 1. In this preservation inspection, an anti-mold preservation inspection was conducted using a thermo-hygrostate having a temperature of 30° C. and humidity of 80%. In Comparative Examples 1, 2 and 3, the same product as that of each of Examples 1, 2 and 3 is packaged without putting a deoxidant into a bag. Products to be inspected each has a net weight of 75 g. Packaging material for package bags are those having no permeability of KNY/PE/CPP three layers. Each product to be inspected is sealed into a package bag under such conditions that the bag contains air therein.

TABLE 1

| | Example 1 Product to be inspected No. | | | | | Example 2 Product to be inspected No. | | | | | Example 3 Product to be inspected No. | | | | | Comparative example 1 Product to be inspected No. | | | | | Comparative example 2 Product to be inspected No. | | | | | Comparative example 3 Product to be inspected No. | | | | |
|---|---|---|---|---|---|---|---|---|---|---|---|---|---|---|---|---|---|---|---|---|---|---|---|---|---|---|---|---|---|---|
| Number of elapsed days (day) | 1 | 2 | 3 | 4 | 5 | 1 | 2 | 3 | 4 | 5 | 1 | 2 | 3 | 4 | 5 | 1 | 2 | 3 | 4 | 5 | 1 | 2 | 3 | 4 | 5 | 1 | 2 | 3 | 4 | 5 |
| 0 | − | − | − | − | − | − | − | − | − | − | − | − | − | − | − | − | − | − | − | − | − | − | − | − | − | − | − | − | − | − |
| 2 | − | − | − | − | − | − | − | − | − | − | − | − | − | − | − | − | − | − | − | − | − | − | − | − | − | − | − | − | − | − |
| 4 | − | − | − | − | − | − | − | − | − | − | − | − | − | − | − | − | − | − | − | − | − | − | − | − | − | − | − | − | − | − |
| 6 | − | − | − | − | − | − | − | − | − | − | − | − | − | − | − | − | − | − | − | − | − | − | − | − | − | − | − | − | − | − |
| 8 | − | − | − | − | − | − | − | − | − | − | − | − | − | − | − | ± | − | ± | ± | − | ± | ± | − | ± | ± | − | ± | − | − | ± |
| 10 | − | − | − | − | − | − | − | − | − | − | − | − | − | − | − | + | ± | + | + | ± | + | + | ± | + | + | ± | + | ± | ± | + |
| 12 | − | − | − | − | − | − | − | − | − | − | − | − | − | − | − | + | + | + | + | + | + | + | + | + | + | + | + | + | + | + |
| 14 | − | − | − | − | − | − | − | − | − | − | − | − | − | − | − | + | + | + | + | + | + | + | + | + | + | + | + | + | + | + |
| 16 | − | − | − | − | − | − | − | − | − | − | − | − | − | − | − | + | + | + | + | + | + | + | + | + | + | + | + | + | + | + |
| 18 | − | − | − | − | − | − | − | − | − | − | − | − | − | − | − | + | + | + | + | + | | | | + | | + | + | + | + | + |
| 20 | − | − | − | − | − | − | − | − | − | − | − | − | − | − | − | | | | | | | | | | | + | + | + | + | + |
| 22 | − | − | − | − | − | − | − | − | − | − | − | − | − | − | − | | | | | | | | | | | | | + | | |
| 24 | − | − | − | − | − | − | − | − | − | − | − | − | − | − | − | | | | | | | | | | | | | | | |
| 26 | − | − | − | − | − | − | − | − | − | − | − | − | − | − | − | | | | | | | | | | | | | | | |
| 28 | − | − | − | − | − | − | − | − | − | − | − | − | − | − | − | | | | | | | | | | | | | | | |
| 30 | − | − | − | − | − | − | − | − | − | − | − | − | − | − | − | | | | | | | | | | | | | | | |
| 32 | − | − | − | − | − | − | − | − | − | − | − | − | − | − | − | | | | | | | | | | | | | | | |
| 34 | − | − | − | − | − | − | − | − | − | − | − | − | − | − | − | | | | | | | | | | | | | | | |
| 36 | − | − | − | − | − | − | − | − | − | − | − | − | − | − | − | | | | | | | | | | | | | | | |
| 38 | − | − | − | − | − | − | − | − | − | − | − | − | − | − | − | | | | | | | | | | | | | | | |
| 40 | − | − | − | − | − | − | − | − | − | − | − | − | − | − | − | | | | | | | | | | | | | | | |

(Note)
− − Mold - not present
± − Mold - a little
+ − Mold - present
— Mold - conspicuous As shown in the above-described Table, it is apparent that in accordance with the method of the present invention, the products are high in preservative properties and excellent in quality. It has been also found that the water content of the products remains unchanged and the products can maintain a high water content of approximately 33 to 38%.

As will be apparent from the foregoing detailed description, the fancy food manufactured by the method of the present invention are products having the taste of sheets of fish meat and of cheese which are harmonized without impairing the desirable properties inherent in the sheet of fish meat and cheese, and in addition, both the texture and feel in eating fish meat and cheese can be enjoyed at the same time. Furthermore, since the water content of the products can be maintained at a high rate, it is possible to provide products which are softer and easier to eat than conventional fancy foods of this kind. Furthermore, products having excellent preservative properties can be provided by the action of deoxidant.

What is claimed is:

1. A method of manufacturing a foodstuff made of fish and cheese as principal constituents which comprises adding starch and other seasonings to mashed fish meat, kneading them together to form a mixture, forming the kneaded mixture into a sheet-like material having a thickness of about 3-5 mm, heating the sheet-like material at a temperature of 80°-85° C., drying said sheet-like material under such heating conditions that the water content is 17-22%, and the thickness of the thus heated fish sheet-like material is about 1-3 mm, sandwiching cheese having a thickness of 3 to 5 mm and a water content of about 42-43% between two sheets of said fish sheet-like material, applying pressure vertically to the two sheets of fish meat with the cheese sandwiched therebetween by means of roaster plates heated at a temperature of 80°-100° C. so that the surface of the fish meat sheets reaches a temperature of 70°-76° C., thus melting cheese in between so as to cause the inner surface of the fish meat to adhere to the melted cheese, cooling the sandwiched foodstuff under such conditions that its water content becomes about 33-38% and its thickness about 4.5-10 mm, cutting the sandwiched foodstuff in elongated shapes so that is width is about 3-10 mm, and packaging the elongated shapes in a package together with a deoxidant.

2. A method of manufacturing a foodstuff to claim 1 in which the cheese is processed cheese and red pepper is uniformly dispersed on the surface of the cheese before the cheese is pressed between the sheet-like fish meat.

3. A method of manufacturing a foodstuff according to claim 1 in which the cheese is processed cheese and horseradish is kneaded with the cheese during the kneading step.

4. A method of manufacturing a foodstuff according to claim 1 in which the water content of the sheet-like material is reduced to a water content of 17-22% by means of a hot air dryer and the sandwiched foodstuff is cooled by means of an air blower until the water content of the sandwiched foodstuff is about 33-38%.

* * * * *